(No Model.) 2 Sheets—Sheet 1.

J. B. ARMSTRONG.
VEHICLE RUNNING GEAR.

No. 319,050. Patented June 2, 1885.

Witnesses:
G. A. Rauberschmitt.
D. P. Cowl.

Inventor:
John Belmer Armstrong
by F. W. Ritter Jr. atty.

N. PETERS, Photo-Lithographer, Washington, D. C.

(No Model.)  2 Sheets—Sheet 2.
J. B. ARMSTRONG.
VEHICLE RUNNING GEAR.
No. 319,050.  Patented June 2, 1885.
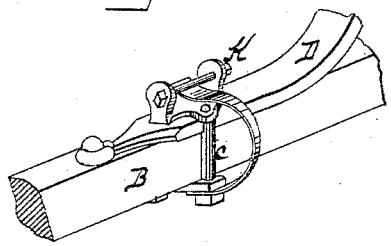
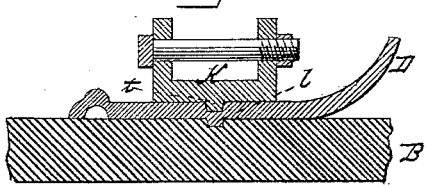
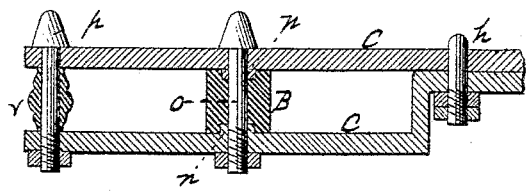
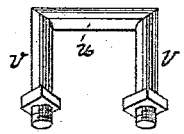
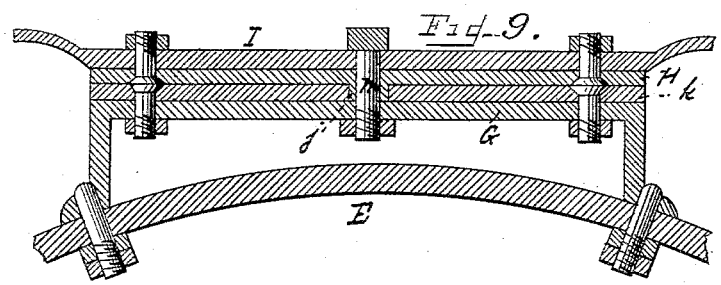

UNITED STATES PATENT OFFICE.

JOHN BELMER ARMSTRONG, OF GUELPH, ONTARIO, CANADA.

VEHICLE RUNNING-GEAR.

SPECIFICATION forming part of Letters Patent No. 319,050, dated June 2, 1885.

Application filed October 18, 1884. (No model.) Patented in Canada September 4, 1884, No. 20,130.

*To all whom it may concern:*

Be it known that I, JOHN BELMER ARMSTRONG, a subject of the Queen of Great Britain, residing at Guelph, in the county of Wellington, in the Province of Ontario, Canada, have invented certain new and useful Improvements in Vehicles; and I hereby declare the following to be a full, clear, and exact description of the same, reference being had to the accompanying drawings, in which—

Figure 1:
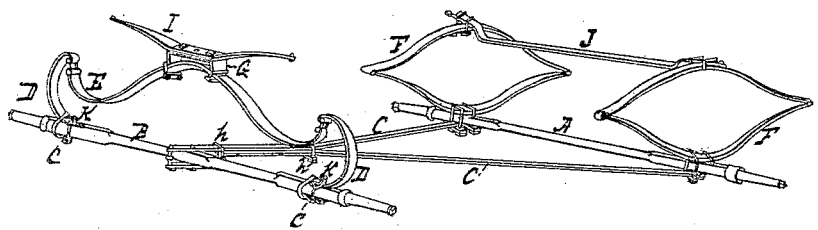
Figure 2:
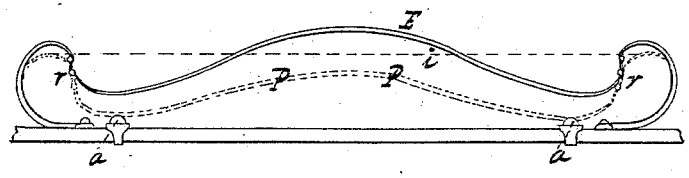
Figure 3:
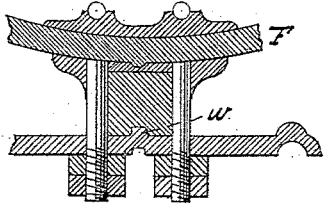
Figure 10:
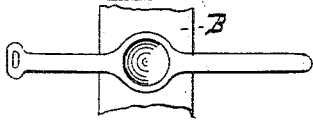
Figure 11:
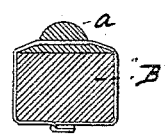

Figure 1 is a general perspective view of running-gear embodying my invention. Fig. 2 is a detail showing the position of the cross-spring, and C-spring supports, receiving-cushion, &c. Fig. 3 is a sectional view of a portion of one of the rear springs, axle, and rear end of perch, showing the manner of rigidly connecting the parts. Figs. 4, 5, and 6 are detail views of a portion of one of the front C-spring supports, front axle, draw-jack, anti-shaft rattlers, &c., showing the construction and connection of the parts. Fig. 7 is a detail showing in section the front ends of the perches and how they are connected with each other and with the front axle. Fig. 8 is a perspective view of a clip. Fig. 9 is a detail sectional view of the supporting-saddle, wear-plates, spring head-bar, &c., with connection to front cross-spring. Figs. 10 and 11 are detail views of the rubber cushion for use with the cross-spring E, and the clip for securing the same to the axle.

Like letters refer to like parts wherever they occur.

The object of the present invention is to produce a simple, elegant, and serviceable running-gear for buggies or carriages, which, being made from steel, will be light and at the same time have a great range for carrying capacity. The main elements which constitute the gear are elliptical rear springs which bear the larger part of the load, a cyma-reversa transverse front spring with tapered C-spring supports, which cushion the side thrusts of the axle, and converging spring-steel perches, which brace the rear axle, holding it and the rear supporting-springs in a true position with relation to the turning-point, the coaction of said elements, as will hereinafter more fully appear, resulting in the production of a vehicle-gear, which combines the strength and carrying capacity of vehicles having only elliptic springs with the easy motion, light and graceful appearance of vehicles in which only semi-elliptic and single-leaf springs are employed.

I will now proceed to describe my invention more fully, so that others skilled in the art to which it appertains may apply the same.

In the drawings, A indicates the rear axle; B, the front axle; C C, the spring-steel perches; D, the C-shaped supports for the cyma-reversa transverse spring E; F, the elliptical rear springs; G, the saddle-support, which rests on the transverse spring E; H, the upper wear-plate, secured to the under side of the front spring-bar, I, and J the rear spring-bar.

By reference to Fig. 1 it will be seen that the C-shaped supports or springs D are placed and rigidly attached near to the shoulders of the front axle. This is a great advantage over the ordinary gear, where the weight rests on the center of the axle, as this position very greatly increases the sustaining capacity of the axle, and in cases of side thrust in the wheel dropping into ruts the cross-spring and C-spring supports are so shaped that they cushion the end thrust of the axle and very much decrease the liability of springing and breaking. The back elliptic springs, F, are set close to the shoulders of the hind axle and directly over the diverging ends of the perches, which have upwardly-projecting teats recessed into the axle, as shown at Fig. 3, all being rigidly connected by clips, bars, &c. The perches are made from tempered steel to prevent them losing shape on being twisted or bent when in use. In this gear the converging perches are held together by the clips $h$; but they may converge directly to a front axle, head-block, or head-plate without being thus united in rear of the front axle, thus forming braces to hold the back axle in a true position to the turning-point. The spring-bars I and J are tempered steel attached as shown; but of course wooden spring-bars could be used.

By reference to Fig. 2 it will be seen that the cross-spring E is a single tapered plate made a heavy double curve or cyma-reversa shape, so that the dotted line $i$, drawn between the points of suspension, passes about midway between the upper and lower curves. The upper end of the lower curves are connected to the C-springs or supports by free swinging shackle-hangers. On the upper surface of the axle B at points beneath the most dependent portion of the spring E I secure small rubber or spring cushions $a$. I find this construction gives a very soft vertical and side motion with either a light or heavy load, and also that when very heavily laden, or in going over an obstruction, the lower curves near the ends will touch on the cushions $a$, which are suitably clipped on top of the axle toward the ends. The effect of this is that the strongest part of the cross-springs between the cushions is left to support the extra weight of load, and the cushions prevent any noise when the spring-plate touches them in vibrating, and also eases the jar, which would occur if striking the bare axle at those points. It will also be seen that the ends of the cross-spring E, being very thin, give the soft motion when wanted, and also act as steel suspension-straps toward the stiffer parts of the spring when heavily laden, thus giving a great range of carrying capacity with a minimum weight of springs and axles. The eyes on the ends of these curved plate supports are formed by rolling the stock of the plate onto a circle.

The method of attaching the back ends of perches is shown in Fig. 3, in which a projecting teat, $w$, formed from the perch, is recessed into the axle and the whole being secured by clips and bars, all forming a secure and rigid connection.

Figs. 4, 5, and 6 show construction and method of rigidly connecting the draw-jacks, front C-springs, and anti-shaft-rattler springs to the front axle and to each other. The C-spring supports have semicircular recesses $d$ on the edges, suitable to the width of the axle, and to receive the bolts $c$, fitting against the sides of axle, as the C is one and one-half inch wide and axle one inch. The draw-jack K has teat $t$, fitting into a recess in the spring-support D, said recess forming a projection, $l$, which is again teated into the axle, all being bound together by the bolts $c$, which are screwed into the extended lugs of the draw-jack. The draw-jack, extending on each side of the semicircular recesses $d$, prevents any weakness between those points.

Fig. 7 is a sectional detail, and shows the front ends of the perches C pivotally connected to the front axle on the lower and upper sides by round bosses $n$, formed out of the solid stock, flanged from the hole through which the bolt $c$ passes, thus making a very strong connection and lessening wear on said bolt $o$. The axle B is countersunk to receive the bosses $n$. The extension of these perch ends in front and on either side of the axle to a point where the bolt $p$, passing through a hollow collar, $r$, connects them together, forms an extra safety-connection, and the ends of the perches, thus extending forward, are made to close together by springing sufficiently to prevent rattling, and take up any slack occasioned by wear at the turning-points on the axle. This extension of perch ends also strengthens the connection to axle.

It will be noticed I make the front axle wider at the center to prevent any rocking of the same between the perches. The spring-steel perches converge from the back axle, and are connected between the axles by the steel clips $h$, as shown, the diverging ends forming braces, which keep the gear in a true position.

The clip (shown in Fig. 8) is very suitable for attaching together parts of a steel carriage-gear. The cross-bar has a flat bottom, $u$, and is formed from steel or iron rod the size of the clip-shanks $v$, at the same time having the corners full and square.

Fig. 9 is a sectional view showing the upper pivot or turning point above the front axle.

G is a saddle-support suitably formed with an open space between the points of connection on top of the cross-spring, thus allowing the full elasticity of the cross-spring between those points, and also leaving room for the fastening at the lower end of the bolt $m$. The upper wear-plate, H, is made with a re-enforced hole, the stock flanged from the hole forming the boss $j$, which fits into the lower plate, $k$, thus making a strong connection and preventing lateral strain and wear on the bolt $m$. The spring-bar I is attached to the wear-plate H by countersunk head-bolts. I preferably use the lower wear-plate, $k$; but it can be dispensed with by making the wear-plate H to rest directly on the supporting-saddle G and having the boss $j$ to pivot in and through the same, as in plate $k$, thus in that case allowing the top of supporting-saddle to form the lower wearing-surface.

Having thus set forth the nature and advantages of my invention, what I claim, and desire to secure by Letters Patent, is—

1. In a vehicle-gear, the combination, with suitable bed or body and axles, of elliptical rear springs, a cyma-reversa front spring having C-spring supports and converging spring-steel perches, substantially as and for the purposes specified.

2. In a vehicle-gear, the combination of a single plate tapering cyma-reversa transverse spring, tapering C-spring supports attached to the axle near the shoulders thereof, free swinging shackles, and spring or elastic cushions secured to the axle below the lower curves of the cyma-reversa spring, substantially as and for the purposes specified.

3. The combination of the front axle, the C-supports, and a draw-jack provided, respectively, with teats or projections and corresponding depressions, and a clip-bar and bolts for rigidly connecting the said parts, substantially as and for the purposes set forth.

4. The combination, with the front axle recessed at the pivot-point, of steel-plate perches having round bosses for engaging in the recesses in the axle and a pivot-bolt for securing the parts, substantially as and for the purposes specified.

5. The combination, with the front and rear axle, of the converging spring-steel perches embracing the front axle, pivoted thereon, and projecting beyond the same in front to form a compensating and stiffening safety-clevis, substantially as and for the purposes specified.

6. The C-spring support arranged parallel with the axle, having the semicircular clip-bolt recesses, in combination with clip-bolts which hug the axle, substantially as and for purposes specified.

7. The combination, with a transverse front spring, of a skeleton supporting-saddle mounted on the transverse spring, for the reception of the wear-plate, substantially as and for the purposes specified.

8. The combination, with a transverse front spring, of a skeleton supporting-saddle and a spring-bar pivoted on the saddle, substantially as and for the purposes specified.

In testimony whereof I affix my signature, in presence of two witnesses, this 11th day of October, 1884.

JOHN BELMER ARMSTRONG.

Witnesses:
WM. E. SLAKER,
R. L. TORRANCE.